United States Patent

Magee et al.

[11] Patent Number: 6,078,476
[45] Date of Patent: Jun. 20, 2000

[54] TWIN HEAD DESIGN FOR MICRO-ACTUATOR POSITION SENSING IN A HARD DISK DRIVE

[75] Inventors: David P. Magee, Plano; Mark W. Heaton, Irving, both of Tex.

[73] Assignee: Texas Instruments Incorporated, Dallas, Tex.

[21] Appl. No.: 08/992,388

[22] Filed: Dec. 17, 1997

[51] Int. Cl.[7] .................................................. G11B 5/55
[52] U.S. Cl. ..................... 360/106; 360/109; 360/78.05; 360/78.12
[58] Field of Search ................... 360/104, 78.05, 360/76, 78.12, 106, 75, 109

[56] References Cited

U.S. PATENT DOCUMENTS

| | | | |
|---|---|---|---|
| 5,724,015 | 3/1998 | Tai et al. ................................ | 335/78 |
| 5,745,319 | 4/1998 | Takekado et al. ................... | 360/104 X |
| 5,834,864 | 10/1998 | Hesterman et al. .............. | 360/78.05 X |
| 5,856,896 | 1/1999 | Berg et al. ............................... | 360/104 |
| 5,867,347 | 2/1999 | Knight et al. ........................... | 360/104 |
| 5,898,544 | 4/1999 | Krinke et al. ........................... | 360/104 |

*Primary Examiner*—Andrew L. Sniezek
*Attorney, Agent, or Firm*—W. Daniel Swaye, Jr.; W. James Brady, III; Frederick J. Telecky, Jr.

[57] ABSTRACT

An actuator architecture allows precision control of a micro-actuator read/write head 16a, 16b by measuring the position directly with the read/write heads rather than relying on a position sensor. The position of the micro-actuator head 16a, 16b with respect to the conventional actuator assembly 12 is determined by comparing the position of the micro-actuator head 16a with the position of a second head 16b affixed to the conventional actuator 12 using disk servo patterns.

5 Claims, 2 Drawing Sheets

TWIN HEAD DESIGN FOR MICRO-ACTUATOR POSITION SENSING IN A HARD DISK DRIVE

CROSS-REFERENCE TO RELATED APPLICATIONS

The following coassigned patent applications are incorporated herein by reference:

| Number | Filing Date | Title |
| --- | --- | --- |
| 60/055177 | 08/08/97 | Dual-Actuator Architecture for Hard Disk Drive Systems |
| 60/055229 | 08/08/97 | Position Sensors for Micro-actuators |

FIELD OF THE INVENTION

This invention generally relates to hard disk drives such as those used for computer systems. More particularly, it relates to position sensing for a micro-actuator using a twin head.

BACKGROUND OF THE INVENTION

Information storage in HDD systems is arranged in concentric "tracks" upon the disks such that information density increases when the concentric tracks are placed closer together. The conventional parameter used to describe this characteristic is "tracks-per-inch" (TPI) which refers to the number of tracks measured along the radius of the disk.

The above referenced micro-actuator applications, and other prior art micro-actuator and multi-actuator designs have sought to enable more precise control of the position of the HDD read/write heads relative to a desired location, so that higher TPIs can be achieved in practical HDD systems compared to conventional single actuator HDD systems.

In the first co-assigned case cited above, an improved HDD actuator is described which overcomes limitations with rotation bearings, external disturbances, servo write errors, and mechanical resonance effects to enable HDD systems to operate with increased TPI disks using a translational micro-actuator. The micro-actuator design includes attaching a read/write head onto a translational micro-actuator installed at the end of the existing actuator arm; the micro-actuator can be precisely driven in position so that the read/write head can be adjusted, over a small range, from track to track.

The second co-assigned case cited above describes some techniques for sensing the position of the head carried by the micro-actuator. These techniques depend on measuring changes in physical quantities related to the micro-actuator position. These techniques rely on very small changes in physical properties and are sensitive to parameter variations.

SUMMARY OF THE INVENTION

The present invention allows precision control of the micro-actuator read/write head by measuring the position directly with the read/write heads rather than relying on a position sensor. According to an embodiment of the present invention, the position of the micro-actuator head with respect to the conventional actuator assembly is determined by comparing the position of the micro-actuator head with a second head affixed to the conventional actuator using disk servo patterns.

An important aspect of micro-actuator systems is having a precise position measurement of the micro-actuator with respect to the conventional actuator for the micro-actuator control electronics. Since the servo patterns on the disk can be used to determine the position of each head, their global position is known when data is read from the disk. This mode of position measurement is the typical method used in today's hard disk drives that contain only one head per actuator. In the twin head system, once the global position of each head has been determined, the relative position between the two heads is computed by just subtracting the two measurements. This relative position measurement between the two heads becomes the position measurement for the micro-actuator.

An advantage of the present invention is the position measurement is much more accurate than previous approaches because it incorporates measurements directly from the disk instead of calculations from an analytical model.

An additional advantage of the present invention is it can be incorporated into most micro-actuator designs in addition to the specific embodiment described in detail below.

An additional advantage of the present invention is isolation from micro-actuator variables inherent in the sensor type position control, resulting in more simplified control algorithms and electronics.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

The preferred embodiment of the present invention is best understood by referring to FIGS. 1–5 of the drawings, like numerals are used for like and corresponding parts of drawings 1–4.

Figure 1A:
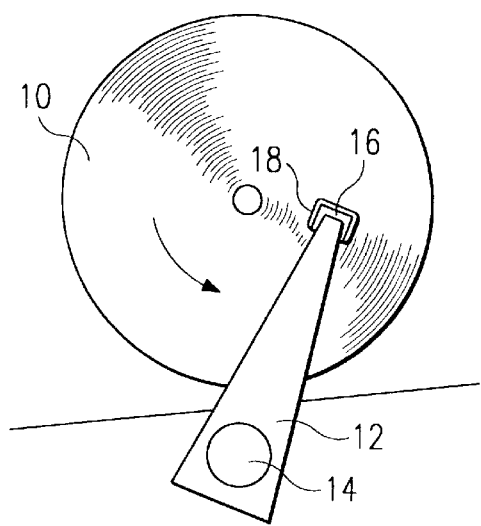
FIG. 1a Shows a prior art hard disk drive dual-actuator design.

With reference to FIG. 1a, there is shown a simplified structure of an actuator according to the prior art. This single actuator design includes a rotating platter or disk 10, having a surface of magnetic material for storing data. An actuator arm 12 rotates about a pivot point 14 to move a read/write head 16 in an arc over the rotating disk 10. In the dual-actuator design, further illustrated in FIG. 1b, the head 16 is placed on a micro-actuator 18 fixed to the end of the actuator arm 12. The micro-actuator 18 moves the head 16 relative to the actuator arm 12. While this drawing is highly simplified, it illustrates the general concept of hard disk drives according to the prior art.

The term "dual-actuator" used above illustrates that there are two actuators: the conventional actuator which controls the position of the arm in the manner normally employed in HDD systems, and the micro-actuator which controls the eventual position of the read/write head as it is moved relative to the conventional arm. (As used herein, the conventional actuator will be referred to as "actuator," and the additional actuator will be termed "micro-actuator".) In operation, both the conventional actuator and the micro-actuator operate simultaneously, but the micro-actuator determines the ultimate position of the read/write head. In effect, the conventional actuator determines the "relatively coarse" position (within a few tracks) and the micro-actuator determines the "fine" position (to within fractions of a track), for higher TPI systems than now possible.

Figure 2:
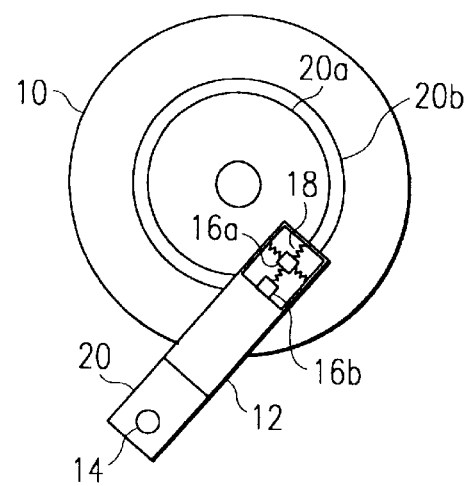
FIG. 2 Illustrates hard disk drive having a twin head according to an embodiment of the present invention.
Figure 1B:
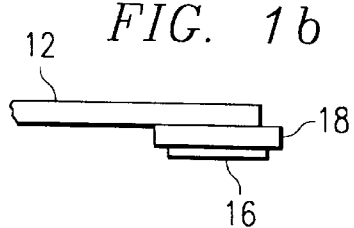
FIG. 1b Shows a side view of the actuator and head of FIG. 1.

With reference to FIG. 2, there is shown a top view of a simplified structure of an actuator according to an embodiment of the present invention. As in the prior art, an actuator arm 12 is typically connected to an E-Block 20. The actuator arm and E-Block rotate about a pivot point or shaft 14. Movement of the actuator arms is typically provided by a voice coil motor (VCM), not shown in this diagram. Read/write heads 16a, 16b are attached to the actuator arm. The heads move in an arc over the rotating platter or disk 10. In the twin head design, one head 16a is placed on a micro-actuator 18 fixed to the end of the actuator arm 12, while a second head 16b is affixed to the conventional actuator arm 12. The micro-actuator moves the first head 16a relative to the actuator arm 12. As the spindle motor (not shown) rotates the disk, each of the heads follows a track of data on the disk. For example, head 1 16a reads track 1 20a, and head 2 16a reads track 2 20b. Also, both heads may be able to read the same track. This is accomplished by independent control of the head position, where head 2 is separated from head 1 by a micro-actuator.

An important aspect of micro-actuator systems is having a precise position measurement of the micro-actuator with respect to the conventional actuator for the micro-actuator control electronics. Since the servo patterns on the disk can be used to determine the position of each head, their global position is known when data is read from the disk. This mode of position measurement is the typical method used in today's hard disk drives that contain only one head per actuator. In the twin head system, once the global position of each head has been determined, the relative position between the two heads is computed by just subtracting the two measurements. This relative position measurement between the two heads becomes the position measurement for the micro-actuator. The twin head configuration of the present invention can be used in conjunction with most micro-actuator designs to give an accurate position measurement. Accordingly, the present invention allows precision control of the micro-actuator read/write head by measuring the position directly with the read/write heads rather than relying on a position sensor which is susceptible to parameter variations.

Figure 3:
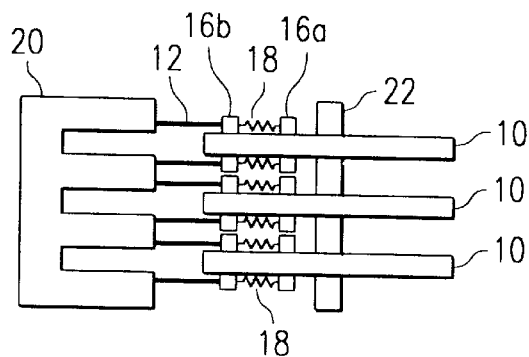
FIG. 3 Illustrates another embodiment having a twin head for each disk surface.

With reference to FIG. 3, there is shown a side view of a simplified structure of a micro-actuator according to another embodiment of the present invention. This embodiment illustrates the typical situation of having several disks 10 each having recordable media on either side that can be used to store data with a read/write head. The circular disks 10 rotate about a spindle 22. According to this embodiment of the present invention, each surface of the disk has two heads 16a, 16b. The innermost head 16a is positioned by a micro-actuator 18. An E-Block 18 has an actuator arm for each disk surface. Each disk 10 of the disk drive may have this same configuration, where a pair of heads is used for each disk surface. Thus, one read/write head 16b is attached or at least moves in conjunction with each actuator arm, and a second read/write head 16a associated with each disk surface is positioned by a micro-actuator 18 attached to the actuator arm.

Figure 4:
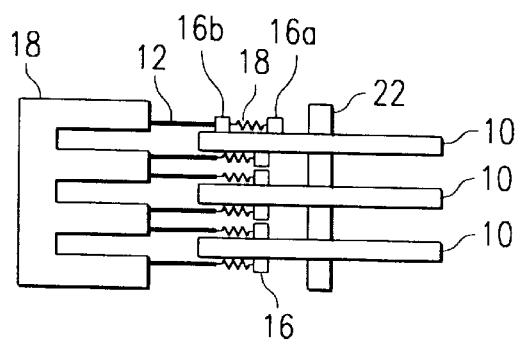
FIG. 4 Shows another embodiment having a twin head for only one disk surface.

With reference to FIG. 4, there is shown a side view of a simplified structure of a micro-actuator according to yet another embodiment of the present invention. An E-Block 18 has an actuator arm for each disk surface. According to this embodiment of the present invention, only one surface of a first disk 10 has two heads 16a, 16b, one of which is positioned by a micro-actuator 18 and a second read/write head 16b is attached or at least moves in conjunction with actuator arm 12. Each of the remaining disk 10 surfaces have a single read/write head positioned by a micro-actuator 18 attached to the actuator arm 12. In this embodiment, the position of the head 16b attached to the microactuator is also used as a position reference for the heads 16 associated with other disk surfaces in addition to being used as a position reference for head 16a. This embodiment provides the advantage of lower cost for fewer heads, but would suffer from reduced accuracy in position control of the heads due to variations from disk to disk.

Figure 5:
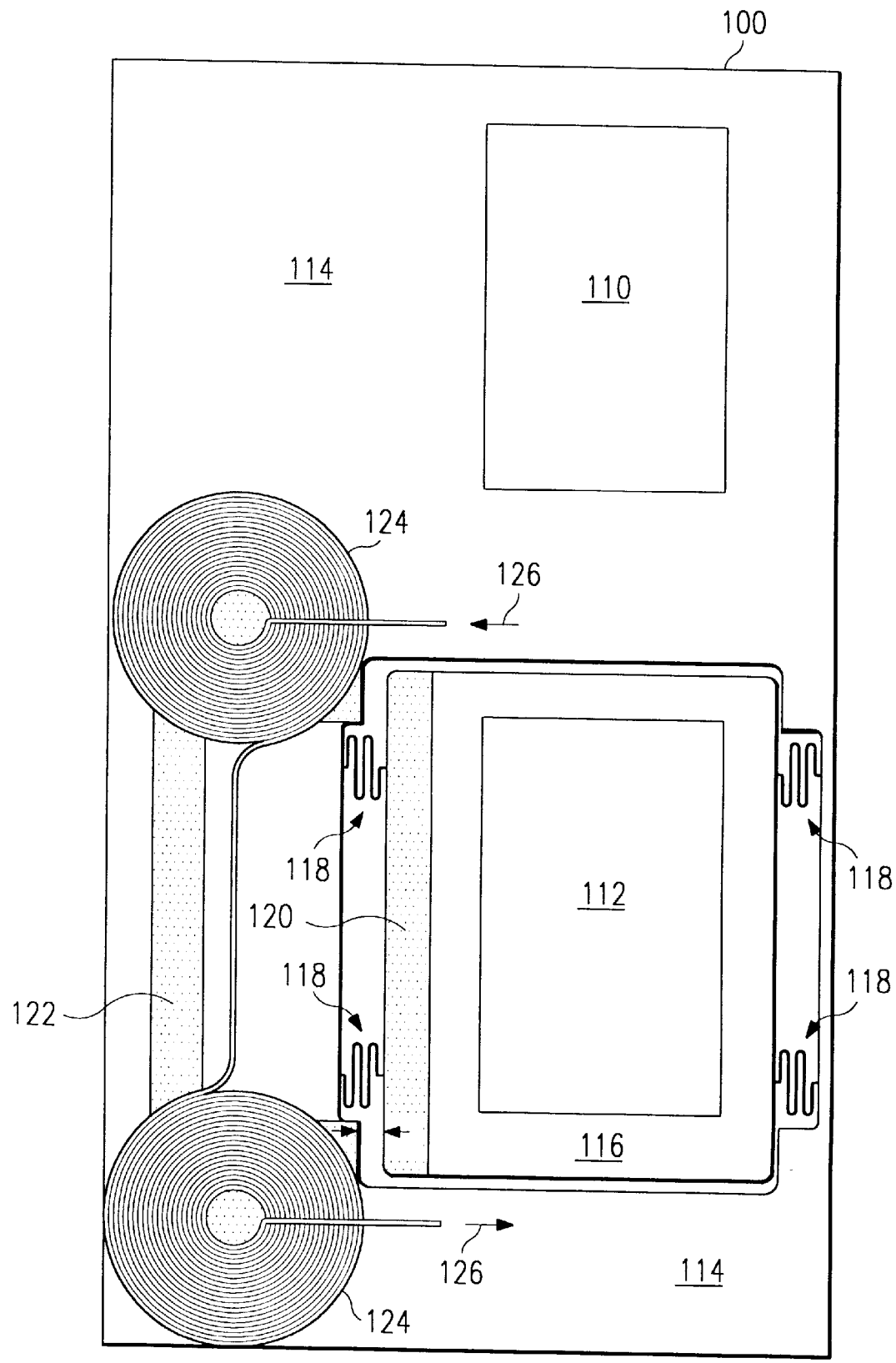
FIG. 5 Shows another embodiment having a twin head with a translational micro-actuator using a reluctance force motor.

FIG. 5 illustrates a top view of an embodiment of the microactuator according to the present invention. This twin head microactuator is similar to the single head microactuator described in the related application introduced above. The twin head microactuator 100 includes two heads 110, 112. The first head 110 is attached to the microactuator frame 114. The second head 112 is attached to a platform 116 which can be moved relative to the remainder of the frame 114. The platform 116 is supported by the microactuator's springs 118 such that when a drive motor or other means for movement is activated, the platform translates or moves in a linear direction. In this embodiment, the drive motor is a reluctance force motor fabricated on the microactuator silicon. The drive motor preferably includes two pancake coils 124 on one side of the motor frame 114. A ferromagnetic material 120, 122 covers at least a portion of the platform 116 and a portion of the motor frame 114 below and between the two coils shown as the cross-hatched areas. The ferromagnetic material is preferably an iron-nickel permalloy plated on the silicon about 20 um thick. The motor moves the platform 116 when a current 126 is passed through the coils 124.

Using a microactuator, the HDD read/write head 112 attached to the movable platform of the microactuator may be moved over one or more tracks without using the main (conventional) actuator. The microactuator device precisely controls the position of the read/write head (where read/write head means read and/or write head), in the localized area at the end of the conventional actuator arm, and the position of the head can therefore be more accurately controlled. In order to determine the actual position of the read/write head 112, a second read/write head 110 is mounted to the frame 114 of the microactuator 110. In the twin head system, the global position of each head is determined in the conventional manner using servo bursts. Subsequently, the relative position between the two heads is computed by subtracting the two measurements. This relative position measurement between the two heads becomes the position measurement for the micro-actuator platform 112 relative to the frame 114. The twin head configuration of the present invention can be used in conjunction with most micro-actuator designs to give an accurate position measurement.

The operation of the microactuator for the present invention may be as described in the related application introduced above. As described therein, when appropriate electrical drive signals are applied to a drive motor (shown in FIG. 5), the springs stretch or compress, and precision controlled deflection of the platform results. The HDD's read/write head will be attached to the movable platform, and the microactuator support assembly is then attached to the end of the actuator arm as described above. The microactuator thereby enables precise controlled movement of the head relative to the actuator arm. In contrast to the previously cited application, the present invention uses a second head for accurately determining and controlling the microactuator position.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A hard disk drive for a computer system comprising:

at least one disk comprised of two disk surfaces, each surface having a magnetic media thereon;

an actuator arm assembly including a first actuator arm for positioning at least two read/write heads over a first disk surface of said at least one disk and a second actuator arm, where one end of said actuator arm assembly pivots about a pivot point adjacent to said at least one disk; and a micro-actuator mounted to each of said actuator arms for movement relative to the respective actuator arm;

wherein said first actuator arm and respective micro-actuator for said first disk surface has at least two heads, a first head affixed to said micro-actuator mounted on said first actuator arm and a second head mounted to said first actuator arm; and wherein said second actuator arm and respective micro-actuator for a second disk surface has only one head affixed thereto, said one head being affixed to said micro-actuator mounted on said second actuator arm.

2. The hard disk drive according to claim 1, wherein a first head of said at least two heads is affixed to the moveable portion of said micro-actuator and a second head is fixed to said first actuator arm and not integrally formed with said micro-actuator.

3. A hard disk drive for a computer system comprising:

at least one disk having magnetic media on one or more surfaces;

an actuator arm for positioning at least two read/write heads over one surface of said at least one disk, where one end of said actuator arm pivots about a pivot point adjacent to said at least one disk; and a micro-actuator mounted to said actuator arm, wherein at least one of said two read/write heads is attached to a moveable portion of said micro-actuator;

wherein a first head of said at least two read/write heads is affixed to the moveable portion of said micro-actuator and a second head of said at least two read/write heads is fixed to said actuator arm and not integrally formed with said micro-actuator.

4. An actuator arm assembly for positioning read/write heads over a disk of a hard disk drive comprising:

an actuator arm for positioning at least two read/write heads over one surface of said disk, where one end of said actuator arm pivots about a pivot point adjacent to said disk; and a micro-actuator mounted to said actuator arm, wherein at least one of said at least two read/write heads is attached to a moveable portion of said micro-actuator;

wherein a first head of said at least two read/write heads is affixed to the moveable portion of said micro-actuator and a second head of said at least two read/write heads is fixed to said actuator arm and not integrally formed with said micro-actuator.

5. A hard disk drive for a computer system comprising:

at least two disks, each having magnetic media on one surface;

an actuator arm assembly comprised of a first actuator arm and a second actuator arm where a first end of each said actuator arms pivots about a pivot point adjacent to said at least two disks;

a microactuator assembly including a moveable platform mounted on a second end of each of said actuator arms and positioned respectively over said one surface of said at least two disks;

wherein said first actuator arm and respective microactuator assembly for a first disk has at least two heads, one head affixed to the moveable platform of said microactuator assembly mounted on said first actuator arm, and a second head mounted to said first actuator arm; and wherein said second actuator arm and corresponding microactuator assembly for a second disk has only one head affixed thereto, said one head being affixed to a moveable platform of said second microactuator.

* * * * *